March 5, 1940.  E. B. FERNBERG  2,192,344
FASTENER
Filed Oct. 15, 1936  2 Sheets-Sheet 1
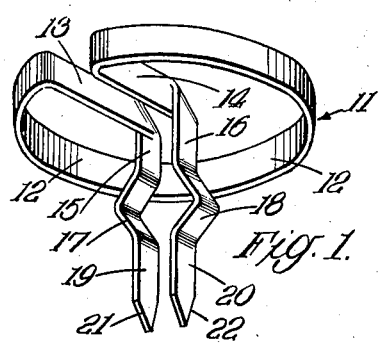
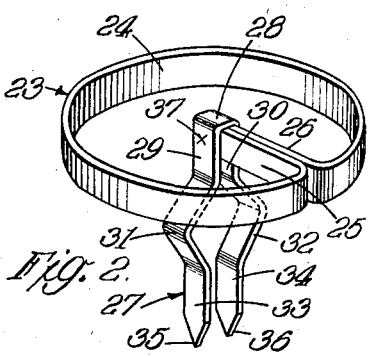
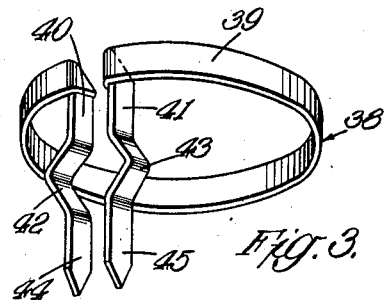
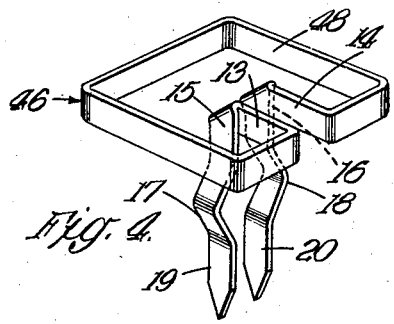
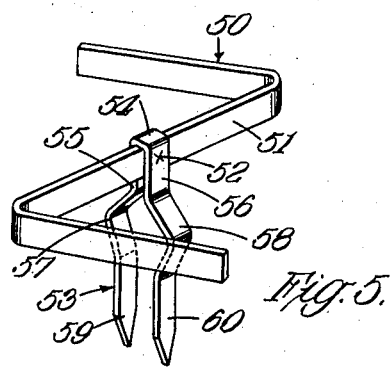
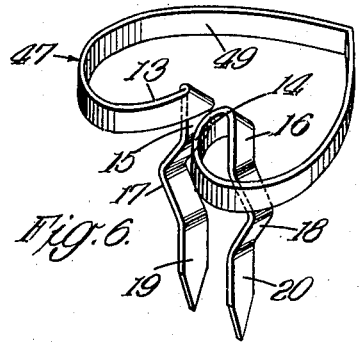
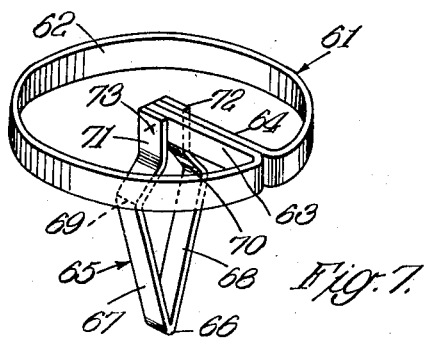
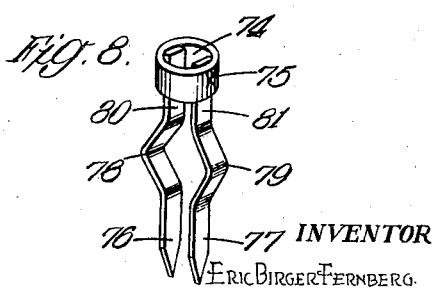
INVENTOR
Eric Birger Fernberg
BY
ATTORNEY March 5, 1940.     E. B. FERNBERG     2,192,344
FASTENER
Filed Oct. 15, 1936     2 Sheets-Sheet 2
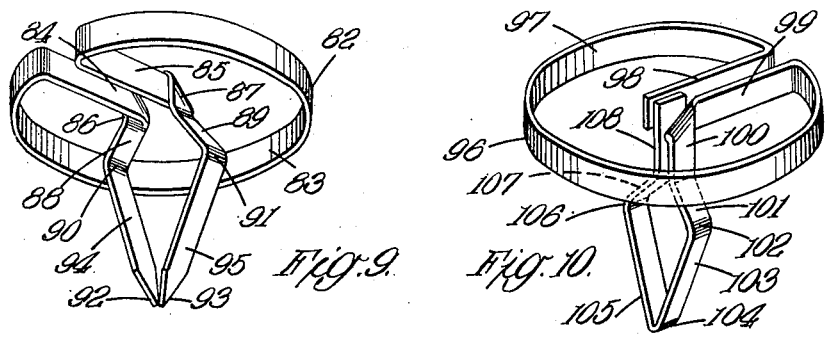
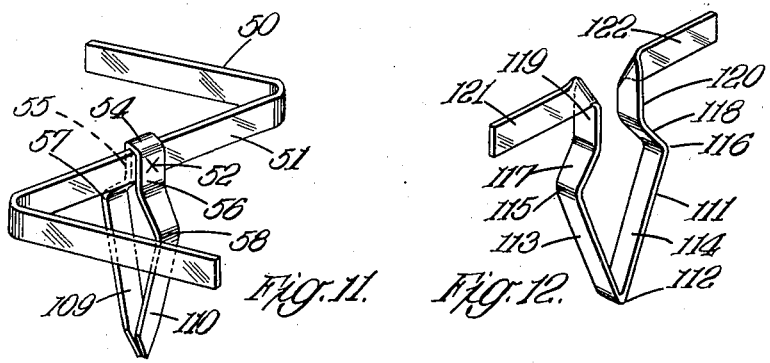
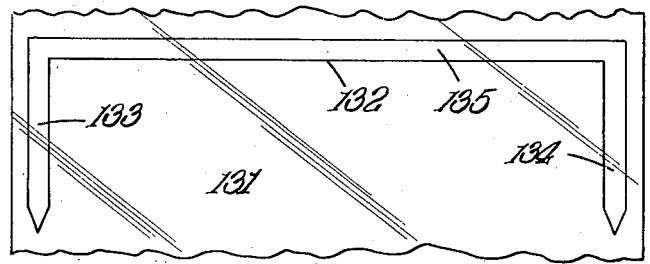
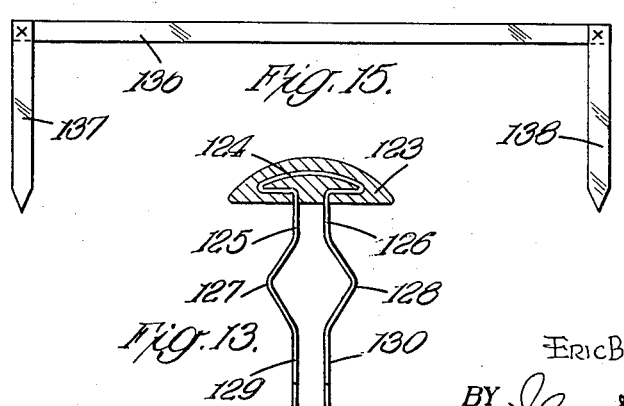
INVENTOR
Eric Birger Fernberg.
BY
ATTORNEY Patented Mar. 5, 1940

2,192,344

UNITED STATES PATENT OFFICE 2,192,344

FASTENER

Eric Birger Fernberg, Pinner, England

Application October 15, 1936, Serial No. 105,738
In Great Britain August 15, 1936

4 Claims. (Cl. 16—4)

My invention relates to an improved fastener for carpets, upholstery and the like. It is of particular value in the automobile industry where carpets or upholstery panels need to be readily removable for cleaning or examination of parts which they conceal.

Such fasteners commonly engage with the walls of apertures, small holes in metal panelling or floors, and are provided with portions resiliently mounted of a dimension larger than the transverse dimension of the aperture whereby when the enlarged portion is pressed into the aperture, it yields, passes through, and subsequently recovers the dimension, whereupon the enlargement achieves the fastening by locking with the walls of the aperture or the inner walls of the panel or flooring which contains the aperture.

My prime object is to provide an improved such fastener, one which may be used with a very minimum of damage to the carpet or other fabric, and one which may be produced at a minimum cost, yet which may be applied and continued in use with a maximum of efficiency.

I form my fastener of narrow relatively thin strip material, yet stiff enough for the attainment of rigidity where rigidity is required, and resiliency where resiliency is required. In the head the strip is pressed edgewise, normal to the plane of the head and hence to the plane of the fabric or carpet. In the prongs the strip is longitudinal. Moreover, the prongs are parallel and spaced apart both in the points and in the neck, whereby the piercing of the fabric and the ultimate lodgment in the fabric is with a minimum of pressure, a minimum of damage to the fabric or carpet, and a certainty of lodgment in the fabric and interlocking therewith. Preferably the prongs and the neck, lie in the same parallel planes. These planes are spaced apart sufficiently to permit the enlarged portions to pass through without contact of the parallel portions avoiding tearing of the fabric. This also secures a maintenance of that regulated resiliency achieved in the initial manufacture.

The invention is illustrated in the accompanying drawings of which Figures 1 to 12 are perspective views of several modifications, Figure 13 is a side view, with the head in section of a further modification, and Figures 14 and 15 are views showing the sheet from which the fasteners may be blanked and the blank itself respectively.

According to Figure 1 the fastener comprises a single strip of resilient material, such as tempered spring steel, designated generally by the reference numeral 11, the strip is bent to form a ring-shaped head 12, portions 13, 14 being bent inwardly radially of the ring, then bent substantially at right angles to the general plane of the ring to form a neck, the two limbs 15, 16 of which lie in spaced relationship, then formed into opposed outwardly directed projections 17, 18 and finally bent to present the two prongs 19, 20 lying in the same spaced parallel relationship as the neck limbs 15, 16, the ends of the prongs 19, 20 being sharply pointed, as at 21, 22 to facilitate perforation of the carpet or like material.

Figures 1, 3, 4, 6, 9, 10, 12 and 13 show my fastener as constituted of one strip of material, while Figures 2, 5, 7, 8 and 11 show it constituted of two or more pieces of material, the one constituting the head of one shape or another, and the other constituting the prongs. Except that the prongs of certain of the forms of the invention are of converging form at the points and in some cases the points are joined together, the differences between the various forms are simply differences in the shape of a head. The heads are variously shown as circular, square, Z-shaped, heart-shaped, and line form.

The spaced relationship of the prongs and neck limbs ensures that, when the prongs are forced through the webbing of a carpet, a plurality of threads will be embraced thereby so that the fastener as a whole cannot be pulled through the webbing, by tearing it, but the ring portion thereof will embed in the pile of the carpet and be substantially invisible.

In the modification of Figure 2, the fastener is formed in two portions; a strip designated generally by the numeral 23 is bent into the form of a ring 24, the ends being directed radially inwardly as at 25, 26. The second portion 27 also a strip, is bent at substantially its mid-point, as at 28, to present as before a neck portion, the limbs 29, 30 of which lie in parallel spaced relation, then formed with outwardly directed V-shaped projections 31, 32 and finally bent to present prongs 33, 34 in alignment with the limbs 29, 30, the prongs being pointed as at 35, 36.

The U-portion of the strip 27 created at the bend 28 by the limbs 29, 30 embraces the inwardly directed portions 25, 26 of the strip 23, and is secured thereto by, e. g., welding, as indicated at 37.

According to Figure 3 the strip, designated generally by the numeral 38, is bent into the form of a ring 39 and in the periphery of the ring is bent downwardly to present a neck portion as before, the limbs 40, 41 of which are continued into the projections 42, 43 and prongs 44, 45 as in Figure 1, but the inwardly directed radial arms are dispensed with.

Figure 4 shows the fastener with the head in the form of a square, Figure 5 with the head in the form of a Z, and Figure 6 with the head in the form of a heart. In each case the point and neck portions of the prongs lie in spaced parallel planes as in the instance of the forms of Figures 1 to 3.

A further modification is shown in Figure 5, in which the fastener is formed in two portions, the ring being replaced by a separate strip, designated generally by the numeral 50 bent to the form of a Z, arranged on edge, the second portion formed similarly to the second portion of Figure 2, embracing the web 51 of the Z and being spot welded thereto, as indicated at 52. The second portion comprises a strip designated generally by the numeral 53, bent midway along its length as at 54, to present the two parallel spaced limbs 55, 56 of the neck portion, then bent outwardly to form the projections 57, 58 and finally bent to form the prongs 59, 60.

According to Figure 7, the prong portion of the fastener is modified. The fastener is made in two portions, the one strip designated generally by the numeral 61, is bent into the form of a ring 62 with inwardly directed radial ends 63, 64. The second strip 65 is in the form of an inverted V, being bent sharply as at 66 substantially to a point, the limbs 67, 68 diverging outwardly to 69, 70, which form the projections corresponding with the projections 17, 18 of Figure 1 and then bent convergingly to the spaced parallel portions 71, 72 arranged to embrace the arms 63, 64 and be spot welded thereto as indicated at 73.

In Figure 8, a ring 74 has welded to it, as at 75, two independent prong members 76, 77, each formed with projections 78, 79 and spaced parallel neck portions 80, 81.

Figure 9 shows a simple modification of Figure 1, in which the strip, designated generally by the numeral 82, is first bent into the form of a ring 83, then inwardly and radially as at 84, 85 then lapped as at 86, 87 and bent downwardly to present the diverging arms 88, 89 which are bent at 90, 91 convergingly so that the pointed ends 92, 93 of the prongs 94, 95 lie closely adjacent each other, whilst according to Figure 10, the strip 96 is bent from one end to the form of a ring 97, commencing with a radial limb 98, then bent inwardly to present a second radial limb 99, paralleling the limb 98, then downwardly to present the one limb 100 of the neck portion of the fastener, outwardly at 101 to the point 102, convergingly at 103 to the point 104, then back on itself in a V-bend the limb 105 extending out to the point 106 then at 107 towards the limb 100 and finally bent to the other limb 108 of the neck portion in spaced parallel relation to the limb 100, the end of the limb 108 lying closely adjacent, but being free to move with respect to the radial arm 98.

Figure 11 shows a modification of Figure 5, in which the prongs 109, 110 of the fastener are brought substantially together at their free ends, presenting a V-formation, but otherwise follows closely the construction of Figure 5 and according to Figure 12, the strip 111, is bent midway along its length at 112 to present a V-shape the outwardly diverging limbs 113, 114 being bent back at 115, 116 to the converging portions 117, 118 continuing into the spaced parallel limbs 119, 120 of the neck portion and finally to the outwardly directed arms 121, 122 disposed on edge with respect to the remainder of the strip and adapted to embed in the pile of a carpet when in position.

According to Figure 13, the prong portion of the fastener is attached rigidly to a button head 123 of a moulded synthetic resin, a portion 124 of the strip is bent back on itself, then downwardly to present the limbs 125, 126 of the neck portion, outwardly for the projections 127, 128 and finally to the prongs 129, 130, in a similar spaced parallel relation to the limbs 125, 126.

Figure 14 shows a sheet 131, from which a blank 132 has been punched, the prong portions 133, 134 having already been formed at right angles to the ring portion 135, whilst Figure 15 shows a strip formed of the ring portion 136 and welded thereto, the prong portions 137, 138 before bending to the shape for example of Figure 1.

In the foregoing description, the fastener has been described by itself it being believed to be apparent in what manner it will function to secure for example a carpet to a sheet metal panel or the like.

The foregoing describes several forms of the invention, and it will be understood that the invention is capable of further modification which will fall within the scope of the appended claims.

I claim:

1. Carpet fastener comprising a head, and a pair of prongs spaced throughout the main bodies and having distinct point, locking and neck portions, the point portions being of considerable longitudinal extent and lying in substantially parallel planes with points spaced apart, the space between the neck portions and the space between the point portions being of such dimension that the enlarged portions of the prongs in passing through a fabric may not bring either of them together with sufficient pressure to tend to tear at the piercings a fabric which is pierced by the points and through which the enlarged locking portion is passed.

2. Carpet fastener of an integral one-piece flat strip formation, comprising a head portion in which the flat width of the strip lies at right angles to the plane of the head, and a pair of prongs constituted of the extremities of the flat strip and having the flat length of the strip at substantially right angles to the plane of the head, said prongs having enlarged locking portions constituted by diverting the lengths of the strips laterally of the length thereof.

3. Carpet fastener comprising a head of strip material pressed edgewise normal to the plane of the head and prongs of strip material spaced throughout their main bodies and having distinct point, locking, and neck portions, the neck and point portions lying in parallel planes with the points spaced apart, the length of the prongs strip lying at right angles to the plane of the head.

4. Carpet fastener comprising a head, and prongs spaced throughout their main bodies and having distinct point, enlarged locking, and neck portions, the neck and point portions lying in substantially parallel planes and spaced apart to such an extent that the enlarged locking portions of the prongs in passing throughout a fabric may not bring them together with sufficient pressure to tend to tear at the piercings the fabric which is pierced by the points and through which the enlarged portions are passed.

ERIC BIRGER FERNBERG.